(12) United States Patent
Riphin (10) Patent No.: US 10,033,294 B2
(45) Date of Patent: Jul. 24, 2018

(54) FOLDING PLUG WITH SAFETY COVER (71) Applicant: Ricot Riphin, Youngsville, NC (US)

(72) Inventor: Ricot Riphin, Youngsville, NC (US)

( * ) Notice: Subject to any disclaimer, the term of this patent is extended or adjusted under 35 U.S.C. 154(b) by 0 days.

(21) Appl. No.: 15/073,138

(22) Filed: Mar. 17, 2016

(65) Prior Publication Data

US 2016/0197561 A1 Jul. 7, 2016

Related U.S. Application Data (63) Continuation-in-part of application No. 14/540,045, filed on Nov. 13, 2014.

(51) Int. Cl.
| | |
|---|---|
| *H01R 13/44* | (2006.01) |
| *H02M 7/00* | (2006.01) |
| *H01R 13/42* | (2006.01) |
| *H01R 31/06* | (2006.01) |
| *H01R 13/72* | (2006.01) |
| *H02J 7/00* | (2006.01) |
| *H02J 7/02* | (2016.01) |

(52) U.S. Cl.
CPC ............ *H02M 7/003* (2013.01); *H01R 13/42* (2013.01); *H01R 13/72* (2013.01); *H01R 31/06* (2013.01); *H02J 7/0044* (2013.01); *H02J 7/02* (2013.01)

(58) Field of Classification Search
CPC ...................................................... H01R 31/06
USPC ........................................ 439/131, 142, 528
See application file for complete search history.

(56) References Cited

U.S. PATENT DOCUMENTS

| | | | | |
|---|---|---|---|---|
| 5,510,691 A | | 4/1996 | Palatov | |
| 5,613,863 A | * | 3/1997 | Klaus | ..................... H01R 27/00 439/131 |
| 5,691,882 A | * | 11/1997 | Ma | ....................... H05K 5/0273 361/679.32 |
| 5,829,993 A | * | 11/1998 | Wu | ........................ H01R 27/00 439/131 |
| 5,901,056 A | * | 5/1999 | Hung | ..................... H02J 7/0065 307/64 |
| 6,126,460 A | * | 10/2000 | Wu | ........................ H01R 27/00 439/131 |
| 6,334,788 B1 | * | 1/2002 | Sakaguchi | ........... G11B 33/025 439/528 |
| 6,561,421 B1 | * | 5/2003 | Yu | ........................ G06K 7/0008 235/451 |
| 6,650,534 B2 | * | 11/2003 | Tree | ...................... G06F 1/1626 345/157 |

(Continued)

FOREIGN PATENT DOCUMENTS

GB 2458318 B 9/2009

OTHER PUBLICATIONS

DX dealextreme, Flat Style Super Mini-USB Car Cigarette light Plug charger for Cell phone, Nov. 2013.

*Primary Examiner* — Neil Abrams
(74) *Attorney, Agent, or Firm* — Ward and Smith, P.A.

(57) ABSTRACT

The present invention relates to a novel AC/DC charging plug for use in slim or narrow situations. The AC/DC charging plug can include pivotally mounted lids used to cover AC contact pens. A connector assemble having a USB connector at one end and an axillary plug at the opposite end is also disclosed where the USB end of the connector assembly can be rotated 180 degrees relative to a cover and then slid into a concealed position.

6 Claims, 7 Drawing Sheets

(56) References Cited

U.S. PATENT DOCUMENTS

| | | | | |
|---|---|---|---|---|
| 6,894,457 B2 * | 5/2005 | Germagian | H02M 7/003 | 320/119 |
| 6,960,727 B2 * | 11/2005 | Hering | H01R 13/6633 | 174/135 |
| 7,011,538 B2 * | 3/2006 | Chang | H01R 13/60 | 439/172 |
| 7,072,200 B2 * | 7/2006 | Lanni | H01R 31/065 | 363/146 |
| 7,104,816 B1 | 9/2006 | Wang | | |
| 7,121,852 B2 * | 10/2006 | Ng | H01R 35/04 | 439/131 |
| 7,275,941 B1 * | 10/2007 | Bushby | H01R 13/6397 | 439/133 |
| 7,438,574 B2 * | 10/2008 | Neumann | H01R 13/4532 | 439/172 |
| 7,462,044 B1 * | 12/2008 | Regen | H01R 13/6641 | 439/131 |
| 7,465,901 B2 * | 12/2008 | Yunk | B23K 9/32 | 219/130.1 |
| 7,544,073 B2 * | 6/2009 | Nguyen | G06K 19/07732 | 439/135 |
| 7,556,535 B2 * | 7/2009 | Liao | H01R 13/6273 | 439/640 |
| 7,568,942 B1 * | 8/2009 | Lannon | H01R 13/5213 | 439/136 |
| 7,607,950 B2 * | 10/2009 | Liao | H01R 13/62 | 439/638 |
| 7,713,074 B2 * | 5/2010 | Poo | H01R 13/447 | 439/136 |
| 7,778,037 B2 * | 8/2010 | Huang | G06K 19/07 | 361/737 |
| 7,833,029 B2 * | 11/2010 | Choi | H01R 13/447 | 439/135 |
| 7,938,653 B2 | 5/2011 | Hopwood et al. | | |
| 7,973,512 B2 * | 7/2011 | Sage | H02J 7/0047 | 320/107 |
| 8,096,820 B2 * | 1/2012 | Lyu | H01R 27/00 | 439/141 |
| 8,246,362 B2 * | 8/2012 | Ma | H01R 13/447 | 361/752 |
| 8,251,719 B1 * | 8/2012 | Pan | H05K 5/0278 | 439/142 |
| 8,500,467 B2 * | 8/2013 | Ni | G06K 19/07732 | 439/136 |
| 8,550,856 B2 * | 10/2013 | Lin | H01R 31/06 | 439/638 |
| 8,670,225 B2 * | 3/2014 | Nunes | G01D 9/005 | 340/584 |
| 8,690,600 B1 | 4/2014 | Zeolla | | |
| 8,760,857 B2 * | 6/2014 | Lin | H05K 5/0278 | 206/38 |
| 8,870,601 B2 * | 10/2014 | Lee | H01R 31/06 | 439/131 |
| 8,926,372 B2 * | 1/2015 | McSweyn | H01R 27/02 | 439/640 |
| 8,936,478 B2 * | 1/2015 | Choi | H01R 13/447 | 439/172 |
| 8,974,238 B2 * | 3/2015 | Chou | H01R 13/447 | 361/725 |
| 9,088,086 B2 * | 7/2015 | Tseng | H01R 13/44 | |
| 9,093,848 B2 * | 7/2015 | Miller | H02J 7/0027 | |
| 9,219,340 B2 * | 12/2015 | McSweyn | H01R 27/00 | |
| 9,231,410 B2 | 1/2016 | Wojcik et al. | | |
| 9,385,464 B2 * | 7/2016 | Wu | H01R 27/02 | |
| 9,385,549 B2 * | 7/2016 | Miller | H02J 7/0042 | |
| 9,525,231 B2 * | 12/2016 | Huang | H01R 13/447 | |
| 9,537,248 B2 * | 1/2017 | Hung | H01R 13/502 | |
| 2004/0097127 A1 * | 5/2004 | Smith | H04M 1/04 | 439/533 |
| 2009/0113101 A1 * | 4/2009 | Liu | H01R 31/06 | 710/300 |
| 2011/0050164 A1 | 3/2011 | Partovi et al. | | |
| 2012/0238120 A1 * | 9/2012 | Huang | H01R 13/514 | 439/284 |
| 2013/0076298 A1 | 3/2013 | Miller et al. | | |
| 2016/0141898 A1 * | 5/2016 | Riphin | H02J 7/0044 | 320/114 |

* cited by examiner

FOLDING PLUG WITH SAFETY COVER

This application is a Continuation-In-Part of US non-provisional application Ser. No. 14/540,045, filed on Nov. 13, 2014, now abandoned, which is incorporated herein in its entirety by reference.

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

Field of the Invention

The present invention relates to electrical plugs, which include a pair of contact pins, which project from a housing for insertion into an electrical socket. In particular, it relates to low profile electrical plugs which can be incorporated into flat devices, like a cell phone case or the like, and can even be incorporated into a charging device to provide a low profile charging device charger.

Description of Related Art

In most existing two prong AC electrical plugs (in the United States) fixed pins greatly increase the area volume taken up by the plug, increasing the difficulty in packing and storing situations. Many portable devices have separate cords with plugs, and one of the most frustrating things for cell phone users and laptop users is forgetting the charger or charging cord. Having to have a separate charging device also makes for difficulty in situations where one thought a charger wasn't needed, like a day at the office. In addition, projecting pins can damage equipment and be damaged themselves during storage. The same is true for USB type charging attachments, as well with the plugs being subjected to dirt and grime since corded USB connectors (and similar computer connectors) do not have dust control covers like many memory sticks do.

Folding and flat type devices, which can be utilized in cell phone cases and the like, have been proposed, like in U.S. patent application Ser. No. 14/540,045 for two prong plugs and GB 2458318 for three prong devices. The layout presented is space consuming, even though the concept is good. What is needed is an improved design that can accomplish the goals more efficiently than in those concepts and disclosures.

BRIEF SUMMARY OF THE INVENTION

The present invention relates to a new design wherein an AC/DC charger two prong folding plug design improves the design of flat plugs. It is designed to fit in narrow spaces or can be utilized in cell phone and laptop cases and backs, wherein the chargers goes with the phone in a convenient new design. It also provides a USB corded connection that protects the connection from dirt and debris.

Accordingly, in one embodiment there is a flat, compact AC to DC current converter comprising:
   a) a housing;
   b) an AC to DC converter in one end of the housing;
   c) a top and bottom lid on a portion of the housing opposite the converter, each lid having an open position and a closed position;
   d) an electrical connector consisting of a pair of parallel AC contact pins, wherein the pins are mounted on an axis to rotate together with one of the lids from a stowed position to an open position, the contact pins designed to deliver AC power to the converter; and
   e) wherein in the stowed position the contact pins are entirely enclosed within the housing and covered by the top and bottom lid.

In yet another embodiment, there is a flat, compact AC to DC current converter comprising:
   a) a housing;
   b) an AC to DC converter in one end of the housing;
   c) a top and bottom lid on a portion of the housing opposite the converter each lid having an open position and a closed position;
   d) an electrical connector consisting of a pair of parallel AC contact pins, wherein the pins are mounted, fixed and parallel to the converter portion of the contact pins, the contact pins designed to deliver AC power to the converter; and
   e) wherein in the stowed position the contact pins are entirely enclosed within the housing.

And, in yet another embodiment, there is an AC electrical plug comprising:
   a) a housing;
   b) a top and bottom lid on a portion of the housing, each lid having an open position and a closed position;
   c) an electrical connector consisting of a pair of parallel AC contact pins wherein the pins are mounted in the housing; and
   d) wherein in the stowed position the contact pins are entirely enclosed within the housing and covered by the top and bottom lid.

DETAILED DESCRIPTION OF THE INVENTION

While this invention is susceptible to embodiment in many different forms, there is shown in the drawings and will herein be described in detail, specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings. This detailed description defines the meaning of the terms used herein and specifically describes embodiments in order for those skilled in the art to practice the invention.

Definitions

The terms "about" and "essentially" mean ±10 percent.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

The term "comprising" is not intended to limit inventions to only claiming the present invention with such comprising language. Any invention using the term comprising could be separated into one or more claims using "consisting" or "consisting of" claim language and is so intended.

References throughout this document to "one embodiment", "certain embodiments", and "an embodiment" or similar terms means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

The drawings featured in the figures are for the purpose of illustrating certain convenient embodiments of the present invention, and are not to be considered as limitation thereto. The term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein and use of the term "means" is not intended to be limiting.

As used herein the term "flat" refers to one dimension being relatively thin, about a half inch or less, in general. As shown in the drawings, the device is rectangular and flat on the top and bottom, but generally, in one embodiment, only one side is flat. The device is designed to fit into small spaces, like the back of the phone, in computers, tablets, iPods™, toys, radios, flashlights, remote controls, wireless keyboards, and the like, so being as thin as possible is a useful part of this invention and one can also utilize any device using batteries, such as telephones (landlines), alarms, and the like. Bottom and side contours are contemplated, but only where the device can fit in relatively thin spaces, like the back of a cell phone.

As used herein, the term "AC to DC converter" refers to an electronic device which when fed 120/240 volts, or the like, alternating current from standard available wall current, can convert that current into direct current to charge a cell phone battery or other like device (e.g. laptop or other electronic device).

As used herein, the term "housing" refers to the casing that surrounds both the AC to DC converter and the AC plug.

As used herein, the term "top and bottom lid" and "having an open position and a closed position" refers to a pair of opposing lids which, when open, allow the AC contact pins to be exposed sufficient to plug into an electrical outlet. In one embodiment, they form a back shield to prevent touching the pins, as shown in the figures. In one embodiment, there are contact pin protectors (ridges or the like as shown in the figures) as part of one or both of the lids, which are designed to protect the contact pins when one or more lid is closed. As used herein, the term "portion of the housing opposite the converter" refers to the portion of the housing that does not contain the plug and, rather, contains the current converter. While the plug, in one embodiment, is a separate device, in another embodiment it is the low profile plug in combination with a low profile converter.

As used herein, the term "electrical connector" and "parallel AC contact pins" refers to American two pin AC electrical pins found on a standard American electrical plug for a lamp, computer or the like. This is an ungrounded configuration and not the three prong configuration found on 120 and 220 volt electrical plugs. A three prong plug requires an entirely different configuration. The parallel pens can be twistable to allow folding into the device.

As used herein, the term "mounted on an axis" refers to, in one embodiment, the pair of AC contact pins being mounted such that they swivel but remain parallel to one another, e.g. by mounting on a cylinder than can rotate around an axis.

As used herein, the term "entirely enclosed" refers to the top and bottom lids being brought together to entirely enclose the AC electrical pins within the lids. Especially see the Figures as an example.

As used herein, the term "cell phone" and an "electronic power cord" refers to a smartphone or any other phone type or mobile device that is battery operated and can be charged with an AC power electronic cord.

As used herein, the term "swivel head" refers to a novel part of the invention relating to an electronics cord, like a cell phone charging cord or a USB cord, wherein the head swivels 180 degrees and then slides into a cover that is all built into the cord. Prior art cords such as these have no covers except as a second device. The present device is self-contained, i.e. connector and swivel and cover all built into the cord. The definitions from patent application Ser. No. 14/540,045 are incorporated herein by reference.

As used herein, the term "back of a cell phone or cell phone cover" refers to the back of a cell phone, or in the alternative, the part of a cell phone cover that covers the back of a cell phone.

As used herein, the term "contact pin protectors" refers to ridges or the like which are positioned near the pins when one or more of the covers are closed that protect them from damage during storage, as can be seen in one example in the Figures.

DRAWINGS

Figure 1:
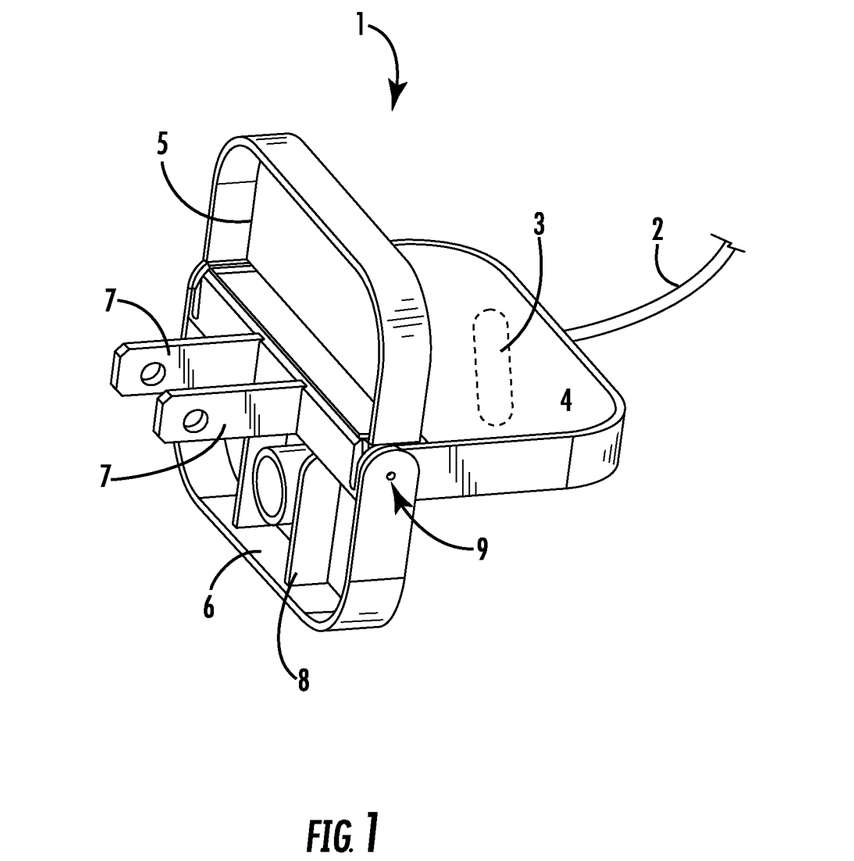
FIG. 1 is a plug and AC/DC converter of the present invention.
Figure 2:
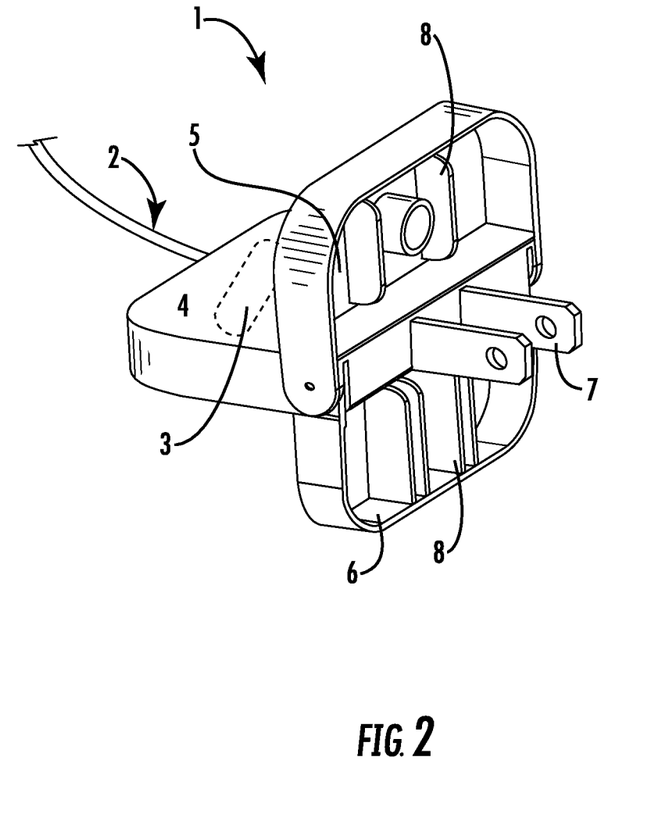
FIG. 2 is an alternate view of plug and AC/DC converter of the present invention.
Figure 7:
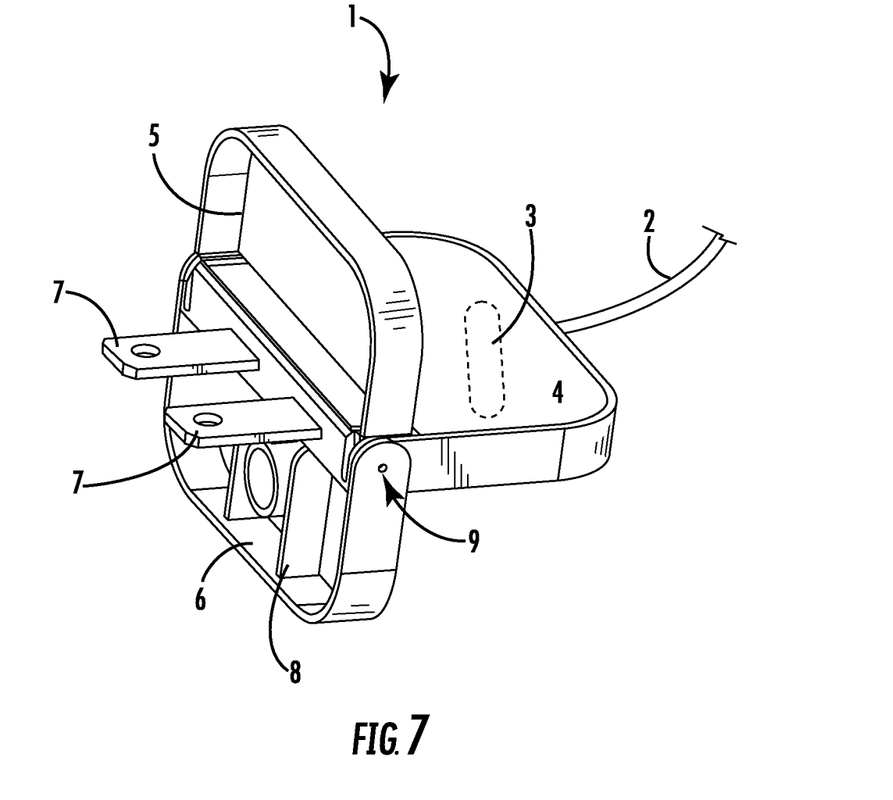
FIG. 7 is an alternate view of FIG. 1 wherein the pins are twisted.

Now referring to the drawings, FIG. 1 is a flat, compact AC to DC Current converter with the plug on the invention 1. Converter 1 consists of power cord 2 for delivering DC power to a device like a cell phone, and an AC/DC converter 3 inside housing side 4. Top lid 5 and bottom lid 6 can open and close around AC pins 7. The device is shown in the open position where the lids provide protection when utilized to plug the device into an electrical socket. Also, seen in this view are contact pin protectors 8 which protect contact pins 7 when lids 5 and 6 are closed around pins 7 by rotating the lids using the pivot pin 9. Note that the pins 7 could pivot or twist, as shown in FIG. 7, or be fixed by means known in the art. In FIG. 2 we see the device 1 from another perspective and note there are contact pin protectors in both the top 5 and bottom 6 lids.

Figure 3:
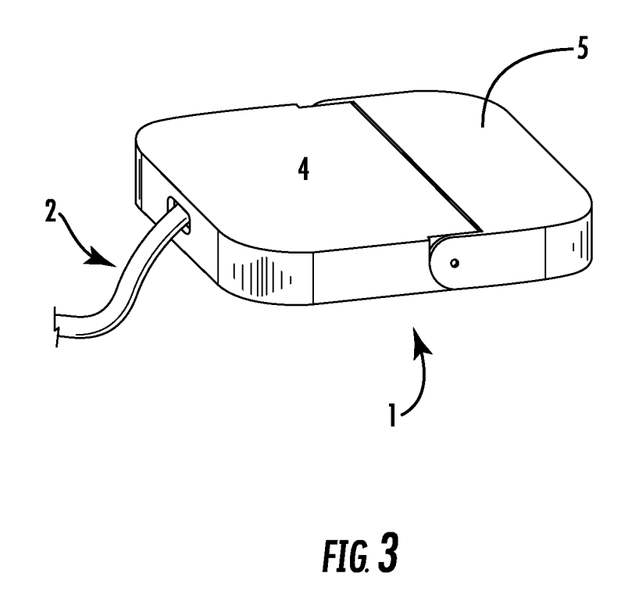
FIG. 3 is a closed version of the device of the invention.
Figure 4:
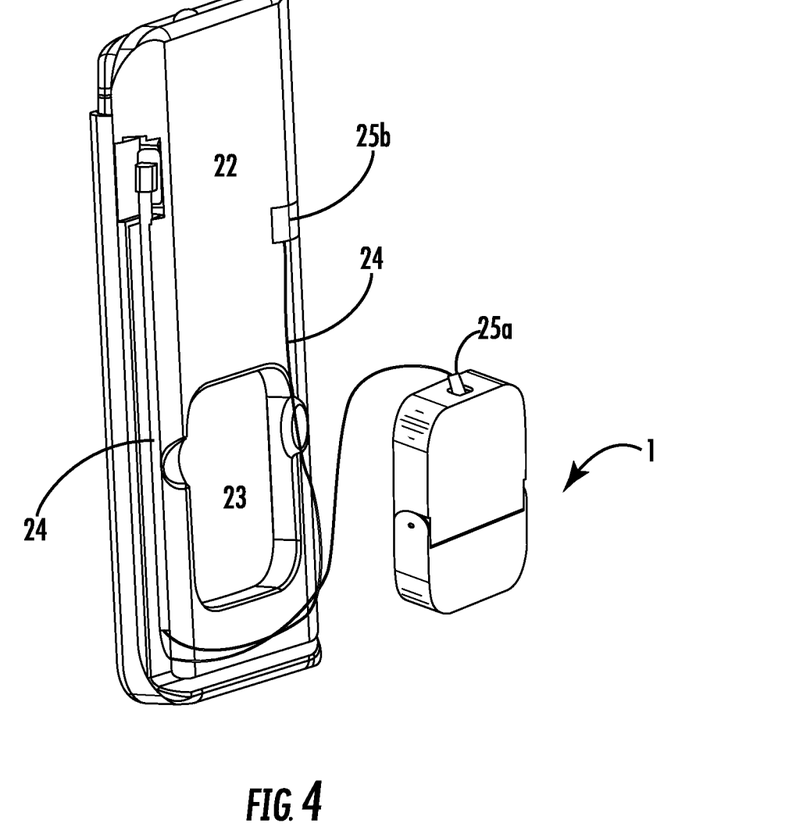
FIG. 4 is a view of the device in the back of a cell phone.

FIG. 3 shows the device 1 with both lids 5, and 6 closed around connector pins 7. In this configuration, the device is essentially flat on both sides and essentially rectangular with rounded edges. FIG. 4 shows the device of FIG. 1 which fits into the back of cell phone case 22. In this view, device 1 fits into depression 23 for storage purposes. Cord 24 is stored in case 22 and then can be connected via swivel connector 25a or stowed in the case back (there are not two cords in this view just both positions shown). In an embodiment not shown, the device 1 attaches to cord 24 at the opposite end and the connector 25b fits into the standard charging port of the device. This connector is a swivel connector in this embodiment, and is either a type of USB connector or a connector to the charging port of the device it is used with. While a cell phone is shown, the flat plug/charger can fit into any device like a laptop, other computer, or other device where the plug needs to be stowed.

Figure 5:
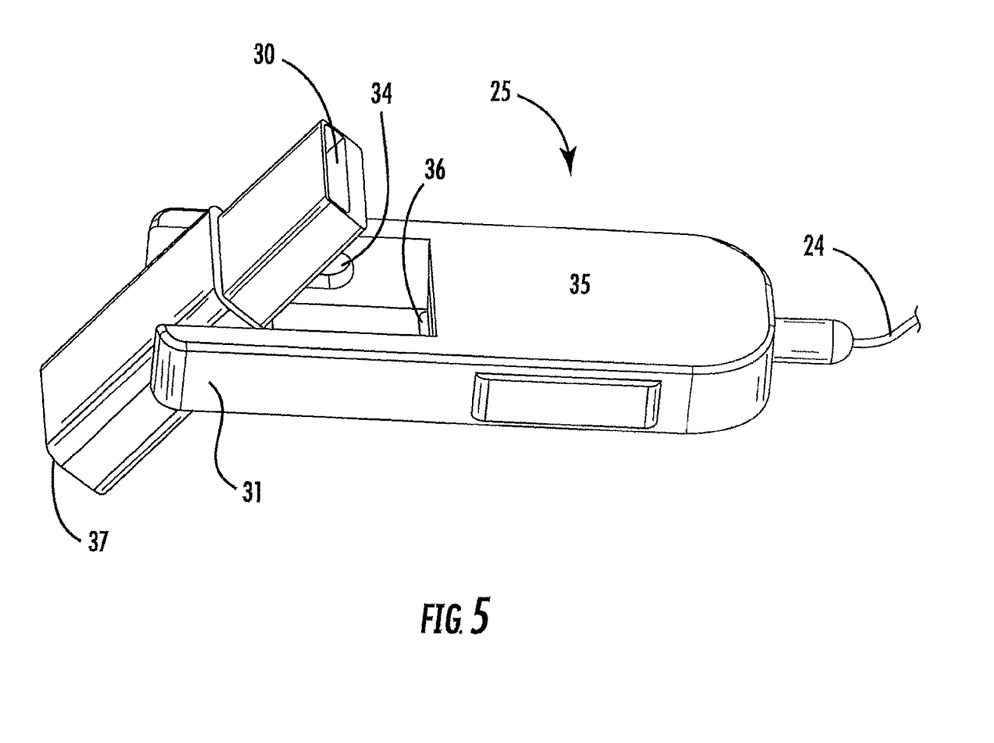
FIG. 5 is a perspective view of an open swivel connector.
Figure 6:
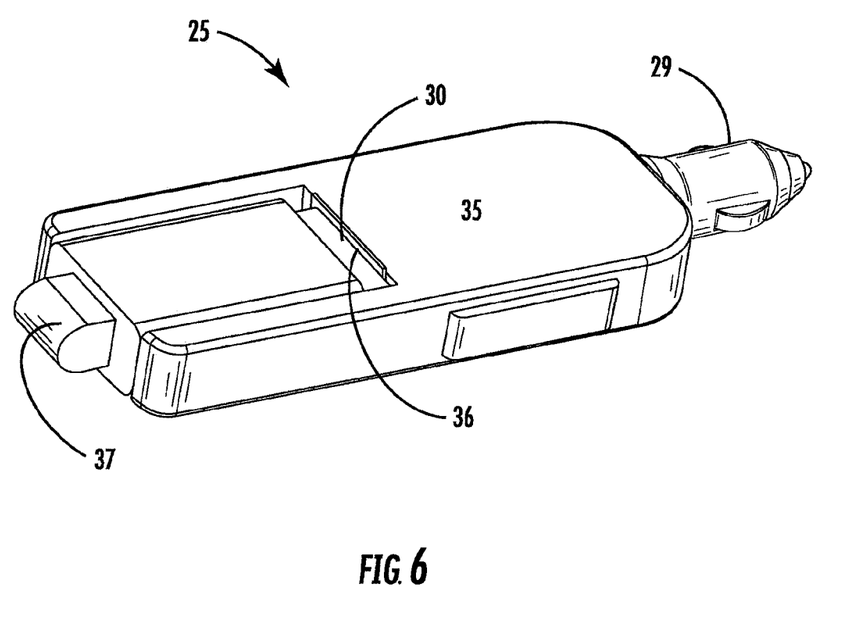
FIG. 6 is a perspective view of a closed swivel connector.

FIG. 5 is a view of a swivel electronics connector 25 of the present invention. In this view USB connector 30 (this could also be a cell phone connector like a mini USB or iPhone® connector or the like) swivels from an open and usable position, shown here, using swivel tab 31 and it can swivel and slide in slide channel 34, from an extended point to, finally, a closed point (in FIG. 6 wherein the USB connector 30 fits inside housing 35 by fitting into housing opening 36). A pull tab 37 is also designed to pull the connector out of housing 35. FIG. 6 shows an embodiment where the device could be plugged into a cigarette type car plug utility plug 29.

Those skilled in the art to which the present invention pertains may make modifications resulting in other embodiments employing principles of the present invention without departing from its spirit or characteristics, particularly upon considering the foregoing teachings. Accordingly, the described embodiments are to be considered in all respects only as illustrative, and not restrictive, and the scope of the present invention is, therefore, indicated by the appended claims rather than by the foregoing description or drawings. Consequently, while the present invention has been described with reference to particular embodiments, modifications of structure, sequence, materials and the like apparent to those skilled in the art still fall within the scope of the invention as claimed by the applicant.

What is claimed is:

1. An apparatus comprising:
   a) a housing;
   b) an AC to DC converter in a first portion of the housing;
   c) a top lid and a bottom lid at a second portion of the housing remote from the AC to DC converter, each lid having an open position and a closed position;
   d) an electrical connector comprising a pair of parallel AC contact pins fixed relative to the housing and parallel to one another, wherein the AC contact pins are configured to provide AC power to the AC to DC converter; and
   e) wherein the AC contact pins are entirely enclosed inside the housing by the top and bottom lids when the top lid is in the closed position and the bottom lid is in the closed position, wherein the apparatus is configured to recess within a back surface of a mobile device or recess within a back surface of a mobile device case.

2. The apparatus according to claim 1 wherein the AC to DC converter is configured to provide DC power to a mobile device power cord.

3. The apparatus according to claim 1 further comprising:
   a power cord configured to recess into the back surface of the mobile device or recess into the back surface of the mobile device case and is connected to the AC to DC converter.

4. The apparatus according to claim 3 wherein the power cord includes a swivel head configured to rotate from an open position to a closed position.

5. The apparatus according to claim 1 further comprising:
   contact pin protectors in an interior of at least one of the top or bottom lids configured to receive the AC contact pins when both lids are in the closed position.

6. An AC electrical plug comprising:
   a) a housing;
   b) a top lid and a bottom lid at a first portion of the housing each lid having an open position and a closed position;
   c) an electrical connector comprising a pair of parallel AC contact pins fixed relative to the housing, wherein the AC contact pins are inside the housing; and
   d) wherein the AC contact pins are entirely enclosed within the housing when the top lid and the bottom lid are each in the closed position, wherein the housing is configured to recess within the back surface of a mobile device or recess within the back surface of a mobile device case when the top lid and the bottom lid are each in the closed position.

* * * * *